L. W. COLVER.
Grain-Drill.
No. 9,439.
Patented Dec. 7, 1852.
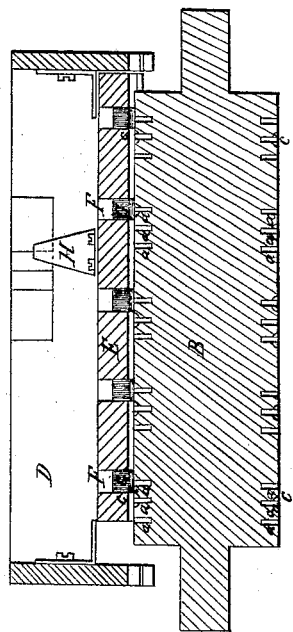
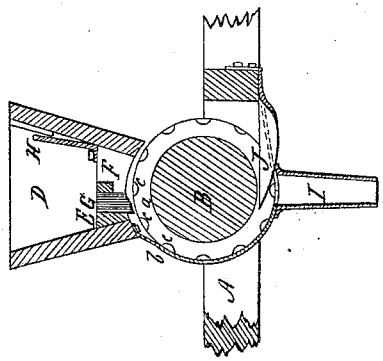
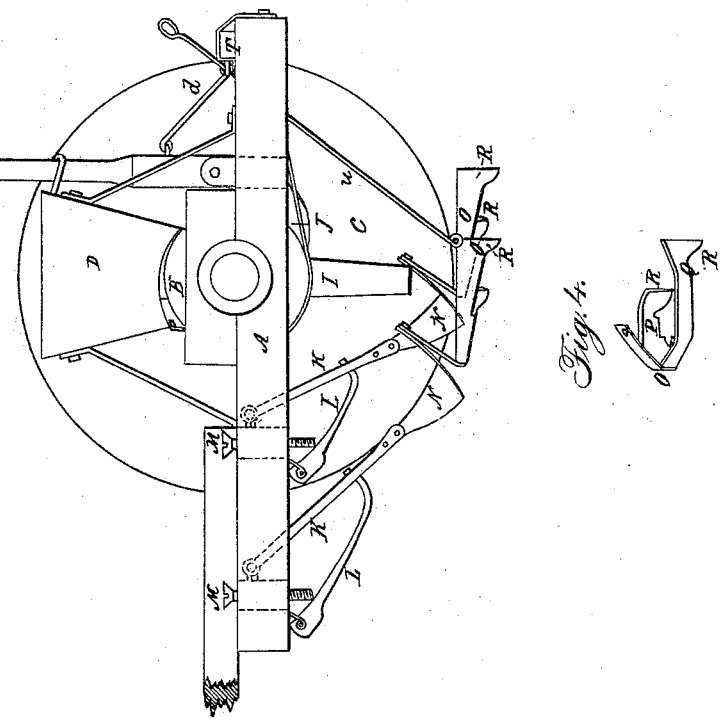

UNITED STATES PATENT OFFICE.

LEWIS W. COLVER, OF LOUISVILLE, KENTUCKY.

IMPROVEMENT IN SEED-PLANTERS.

Specification forming part of Letters Patent No. 9,439, dated December 7, 1852.

*To all whom it may concern:*

Be it known that I, LEWIS W. COLVER, of Louisville, in the county of Jefferson and State of Kentucky, have invented certain new and useful Improvements in Seed-Planters; and I do hereby declare the following to be a full, clear, and exact description of the same, reference being had to the accompanying drawings, making a part thereof, in which—

Figure 1 represents a view from one of the sides with the wheel removed. Fig. 2 represents a longitudinal vertical section through the hopper and seeding-cylinder. Fig. 3 represents a vertical cross-section through the hopper and seeding-cylinder, and Fig. 4 represents a perspective view of one of the covering-shoes detached.

Similar letters in the several figures denote the same parts.

The nature of my invention consists in providing the seeding-cylinder with a series of deep grooves, which have on their outer edges cells for containing a single grain of seed, the other grains from the hopper being kept back by a brush and a cleaner underneath attached to the frame, and extending into said grooves so as to get behind the grains in the cells and force them out into the seeding-tube, from whence they are dropped, one at a time, into the furrow; and also in the peculiar construction of the shoe for opening out the furrow and covering the grains when deposited therein.

To enable others skilled in the art to make and use my invention, I will proceed to describe the same with reference to the drawings.

The frame A is constructed in any well-known substantial manner, and secured to the cylinder B, which forms the axle of the machine, and on which the wheels C are fastened, so that they shall both revolve together. The hopper D is supported on the frame, and is placed immediately over the cylinder B. The bottom E of the hopper is formed of an adjustable sliding board, provided with suitable openings, F, through which the grain may freely pass to the cylinder; and immediately in front of said openings, in the sliding or adjustable bottom, are placed brushes G for sweeping back all the grains except those deposited in the cells and intended to be planted. There may be a pointer or indicator, H, on the sliding bottom, which, with a scale fixed on the inside of the hopper, will indicate the quantity of seed to be sown. The cylinder B is provided with grooves $a\ a\ a$ in sets, each one of the set having a greater or less number of cells, $c\ c$, and each of the openings F in the bottom of the hopper D is made to communicate with either of these sets of grooves and cells, as a greater or less quantity of grain is to be sown. The front of the cylinder is incased or protected by leather $b$, or a thin sheet of metal, (as seen in Fig. 3,) so that the cells may each retain and carry round its single grain, and when they arrive at a point over the seeding-tube I a cleaner, J, firmly fixed to the frame and projecting into the groove, passes behind the grain in the cells, and by its inclined side or wedge-shaped form, forces it out of the cell, whence it drops through the conducting-tube into the furrow opened for it, and thus insuring the carrying around from the hopper and delivering of the grains singly, which is the leading object of this invention.

To the front of the frame are hinged the drag-bars K, and to each one is attached a spring, L, made adjustable by means of the set-screws M, for the purpose of holding the share N and shoe O firmly in the ground while they may also rise to pass over any unyielding obstruction without breaking. The share N divides or cuts the ground in advance of the shoe O, which has an angular-shaped front for spreading out the furrow, and two wings, P Q, one on each side, for holding back the earth until the seed is deposited between them, and the extremities of the shoe form coverers R, which curve or incline toward each other sufficiently for throwing up the earth over the seed sown and at the same time, by making one of the wings longer than the other, leave sufficient space for any clods or lumps of earth which they may scrape up to escape. The coverers R throw up the earth with great regularity of depth, which is particularly necessary in the planting of hemp-seed, for which this apparatus is peculiarly adapted.

S is a lever, which applies a break-beam, T, by means of the rod $d$, to the wheels when turning at the ends of the furrows to stop off the seeding or planting while turning around;

and U, a rod, which may be attached to each one of the shoes, and extending upward, so that the operator can at any time raise the shoe, if for any purpose it is found necessary.

Having thus fully described my invention, what I claim therein as new, and desire to secure by Letters Patent, is—

Making the cells on the tops of the grooves, made as described, so that they shall carry single grains, and combining therewith a cleaner, which extends into the groove behind the seed as each cell in turn arrives at or over the seeding-tube for the purpose of carrying around and depositing with certainty the seeds or grains singly, substantially as described.

L. W. COLVER.

Witnesses:
T. C. DORRY,
A. B. STOUGHTON.